(12) United States Patent
Li et al.

(10) Patent No.: US 9,055,419 B2
(45) Date of Patent: Jun. 9, 2015

(54) MOBILE TERMINAL TO RECOMMEND A SHORT MESSAGE RECIPIENT

(71) Applicant: International Business Machines Corporation, Armonk, NY (US)

(72) Inventors: Ying Li, Beijing (CN); Jing Luo, Beijing (CN); Zhong Su, Beijing (CN); Xiao Xun Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 28 days.

(21) Appl. No.: 13/932,064

(22) Filed: Jul. 1, 2013

(65) Prior Publication Data

US 2013/0288725 A1   Oct. 31, 2013

Related U.S. Application Data

(63) Continuation of application No. 13/362,006, filed on Jan. 31, 2012, now Pat. No. 8,489,626.

(30) Foreign Application Priority Data

Jan. 31, 2011   (CN) .......................... 2011 1 0033804

(51) Int. Cl.
*G06F 17/30* (2006.01)
*H04W 4/14* (2009.01)

(52) U.S. Cl.
CPC ........... *H04W 4/14* (2013.01); *G06F 17/30722* (2013.01)

(58) Field of Classification Search
USPC ...................... 707/7, 728, 758; 709/204–206
See application file for complete search history.

(56) References Cited

U.S. PATENT DOCUMENTS

| | | |
|---|---|---|
| 2007/0130368 A1 | 6/2007 | Martin et al. |
| 2008/0114846 A1 | 5/2008 | Sano |
| 2009/0037413 A1* | 2/2009 | Castell et al. ...................... 707/7 |
| 2009/0049140 A1 | 2/2009 | Stoddard et al. |
| 2009/0100183 A1 | 4/2009 | Lam et al. |
| 2010/0017194 A1 | 1/2010 | Hammer et al. |
| 2010/0138441 A1 | 6/2010 | Ryu |
| 2011/0106796 A1* | 5/2011 | Svaic ........................... 707/728 |

FOREIGN PATENT DOCUMENTS

CN           101820398 A         9/2010

OTHER PUBLICATIONS

Carvalho et al., "Recommending Recipients in the Enron Email Corpus", Technical Report CMU-LTI-07-005, Carnegie Mellon University, Language Technologies Institute, 2007, pp. 1-10.
Dredze et al., "Generating summary keywords for emails using topics", In Proceedings of the 13th International Conference on Intelligent User Interfaces, 2008, pp. 1-8.

* cited by examiner

*Primary Examiner* — Etienne Leroux
(74) *Attorney, Agent, or Firm* — Cantor Colburn LLP; Gail Zarick (57) ABSTRACT

A method and apparatus for recommending a short message recipient. The method includes parsing history short messages of a user to generate data associated with contacts, constructing a semantic association database by using the data, identifying a critical object in a new short message text of the user, analyzing an association between the critical object and the contacts by using the semantic association database, and recommending a short message recipient to the user according to a strength of association.

12 Claims, 8 Drawing Sheets

MOBILE TERMINAL TO RECOMMEND A SHORT MESSAGE RECIPIENT

CROSS-REFERENCE TO RELATED APPLICATION

This is a continuation of U.S. application Ser. No. 13/362,006, filed Jan. 31, 2012, which claims priority under 35 U.S.C. §119 from Chinese Patent Application No. 201110033804.8 filed Jan. 31, 2011, the entire contents of which are incorporated herein by reference.

BACKGROUND OF THE INVENTION

1. Field of the Invention

The present invention relates to a mobile terminal, and particularly to a method and apparatus for recommending a short message recipient to a mobile terminal user.

2. Description of Related Art

The worldwide mobile Internet has entered an explosively rising stage. Currently, users of the China Mobile cell phones have exceeded 500 million. Investigation shows that, there are up to 260 million short messages sent everyday by China Mobile users, and there are approximately 750 million short messages sent a day in China. In particular, a youngster even sends scores of short messages everyday, and receives no less than scores of short messages everyday. Therefore, a rapid location to a short message recipient becomes a key to send short messages.

In the prior art, a mobile terminal provides an address book and a contact list for selection by a sender, but for those recipients who are neither in the contact list nor in the address book, the sender takes longer to send the message. For example, if the sender tries to send a short message to a recipient that is not in the address book, but that recipient has sent a short message to the sender, the sender has to search through a mass of history short messages one by one. In another scenario, if a sender tries to send a short message to someone but does not know his name, even if that person is in the address book, the sender has no way to search for the recipient.

Therefore, there needs an efficient method for recommending a short message recipient, in order to save the sender's time and improve the efficiency of sending the short message.

SUMMARY OF THE INVENTION

Based on the above problem, the present invention provides an efficient method for recommending a short message recipient.

According to a first aspect of the invention, a method for recommending a short message recipient is provided, including the steps of parsing history short messages of a user to generate data associated with contacts, constructing a semantic association database by using the data, identifying a critical object in a new short message text, analyzing an association between the critical object and the contacts by using the semantic association database, and recommending a short message recipient to the user according to a strength of association.

According to a second aspect of the invention, an apparatus for recommending a short message recipient is provided, including a parsing module configured to parse history short messages of a user to generate data associated with contacts, a semantic association database constructing module configured to construct a semantic association database by using the data, an identifying module configured to identify a critical object in a new short message text, a semantic association database analyzing module configured to analyze an association between the critical object and the contacts by using the semantic association database; and a recipient recommending module configured to recommend a short message recipient to the user according to a strength of association.

According to a third aspect of the invention, a computer readable storage medium tangibly embodying a computer readable program code is provided, having computer readable instructions which, when implemented, cause a computer to carry out the steps of a method including parsing history short messages of a user to generate data associated with contacts, constructing a semantic association database by using the data, identifying a critical object in a new short message text of the user, analyzing an association between the critical object and the contacts by using the semantic association database, and recommending a short message recipient to the user according to a strength of association.

BRIEF DESCRIPTION OF THE SEVERAL VIEWS OF THE DRAWINGS

The invention per se, preferred embodiments thereof and the objects and advantages thereof will be better understood by describing exemplary embodiments in detail below in combination with the accompanying drawings.

DETAILED DESCRIPTION

The objects and advantages of the invention will be better understood by describing the method and system for sharing contents between mobile terminals according to the embodiments of the invention in combination with the accompanying drawings.

The central idea of the invention is as follows: generating specific data based on the user's history short messages (including sent history short messages and received history short messages), structurizing the specific data, constructing a semantic association data, identifying a critical object by semantically analyzing a new short message text, analyzing an association between the critical object and the contacts by using the semantic association database, and recommending a short message recipient to the sender in accordance with degree of association between the critical object and the contacts.

Figure 1:
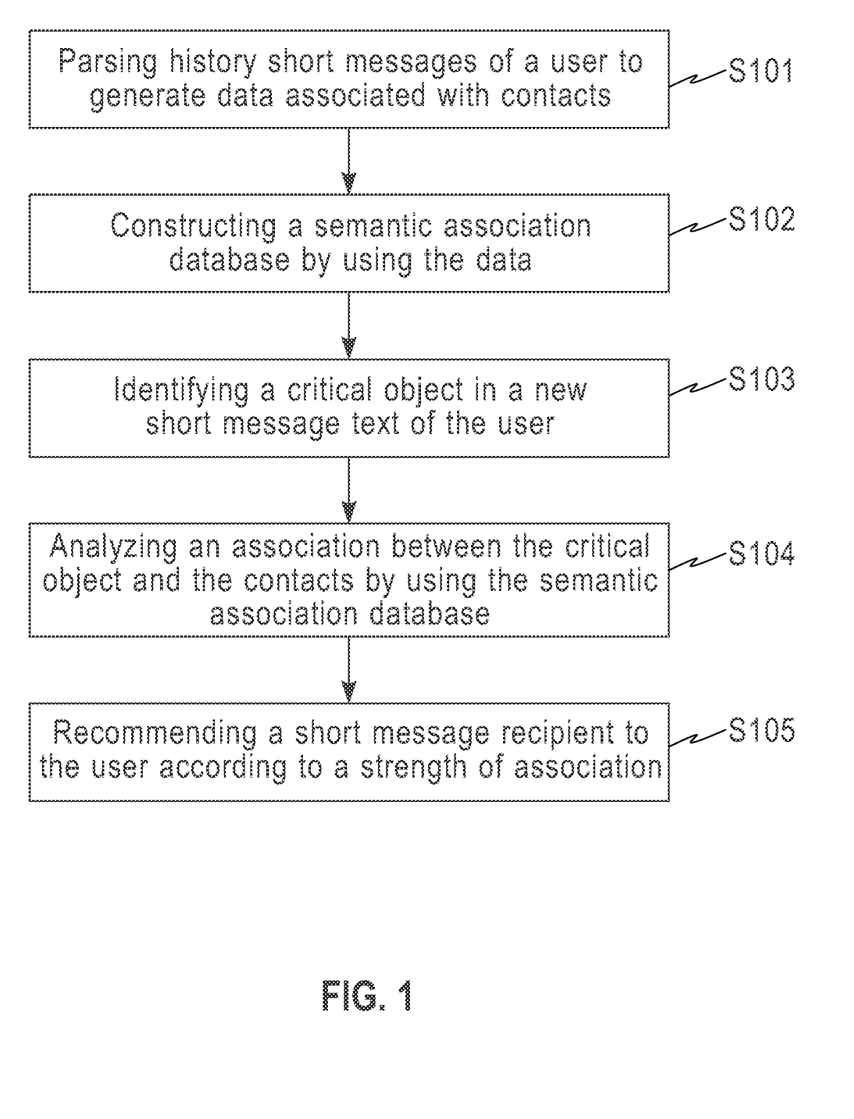
FIG. 1 shows a method for recommending a short message recipient according to an embodiment of the invention.

FIG. 1 shows a method for recommending a short message recipient according to an embodiment of the invention including a step S101 of parsing history short messages of a user to generate data associated with contacts, a step S102 of constructing a semantic association database by using the data, a step S103 of identifying a critical object in a new short message text of the user, a step S104 of analyzing an association between the critical object and the contacts by using the semantic association database, and a step S105 of recommending a short message recipient to the user according to a strength of association.

In the step S101 of parsing history short messages of a user to generate data associated with contacts, the history short messages include sent history short messages and received history short messages. Parsing history short messages to generate data associated with contacts includes acquiring identification information on the contacts of the history short messages and acquiring a name entity list of the history short messages by performing name entity recognition on texts of the history short messages, where the name entity list comprises a plurality of name entities, and the name entities are acquired by name entity recognition NER technology which is used for recognizing entities having special meanings in the texts, mainly including names of persons, names of places, names of facilities, proper nouns, etc.

A name entity in English has a comparatively distinct sign (that is, the initial letter of each word in the entity is capitalized), so recognition of the border of the entity is relatively easy and it is important to determine a category of the entity. Compared with English, name entity recognition in Chinese is more complicated, and compared with a sub-task of labeling a category of the entity, recognition of the border of the entity is more difficult. There are various kinds of methods in the prior art for realizing name entity recognition and they are omitted here for eliminating unnecessary details. According to an embodiment of the invention, name entity recognition is performed on the text of each history short message to generate a corresponding name entity list. The identification information of a contact includes a unique identification ID of the contact of the history short message, e.g., a mobile phone number of the contact.

Parsing the history short messages to generate data associated with contacts further includes acquiring identification information of the contacts of the history short messages and performing a cut word process on the texts of the history short messages to generate a list of words of the history short message, identification information of the words and index information of the words, where the list of words is obtained by performing the cut word process on the texts of the history short messages to thereby cut them to individual words, the identification information of the words includes unique identification IDs generated for each word in the list of words, and the index information of the words includes unique identification IDs generated for the short messages where the words are located and position information of the words in the history short messages.

In the step S102 of constructing a semantic association database by using the data, the semantic association database includes a name entity association database and a critical key association database.

Figure 2:
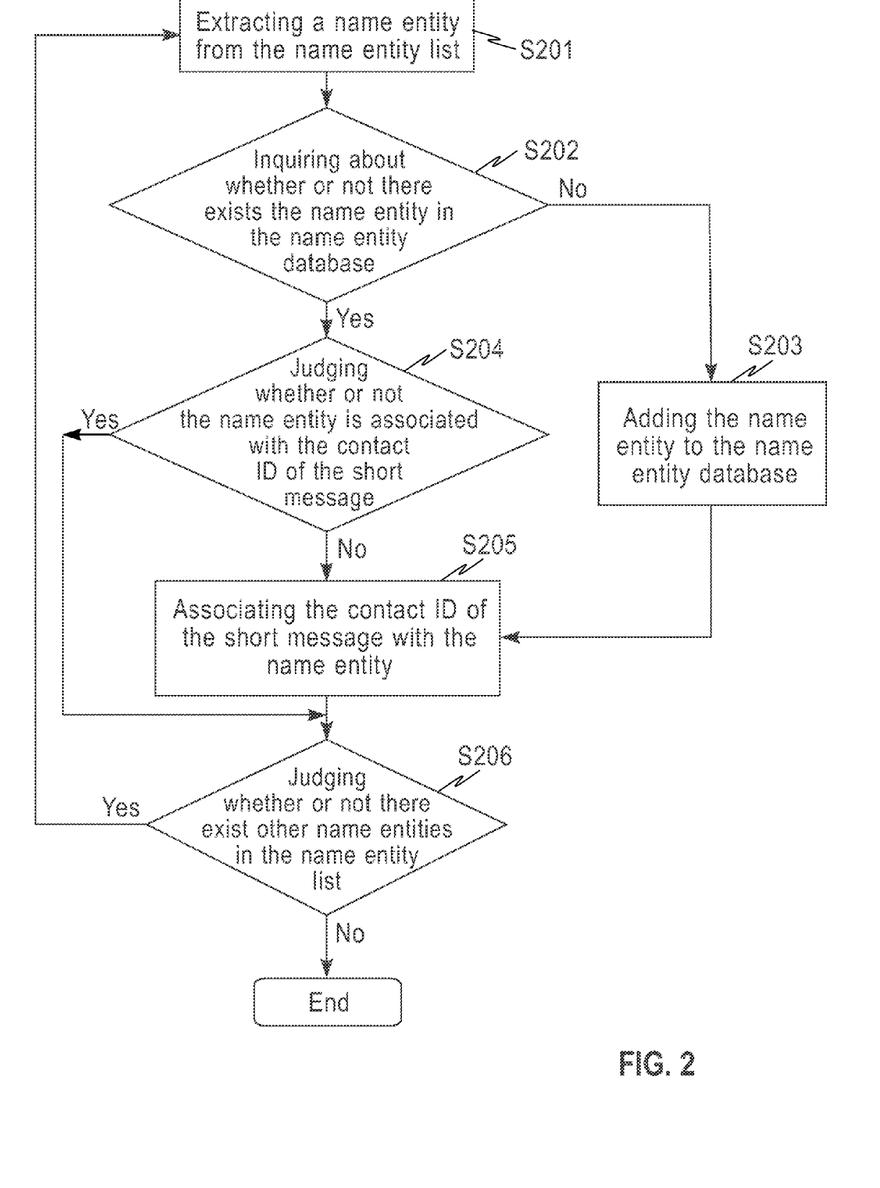
FIG. 2 shows a flow chart of constructing a name entity association database according to an embodiment of the invention.

FIG. 2 shows a flow chart of constructing a name entity association database according to an embodiment of the invention, where the name entity association database is constructed based on a name entity list of a history short message and identification information of the contact of the short message. Specifically, in a step S201, extracting a name entity from the name entity list; in a step S202, inquiring about whether or not there exists the name entity in the name entity database; if the name entity does not exist, in a step S203, adding the name entity to the name entity database and advancing to a step S205; if the name entity exists, in a step S204, further judging whether or not the name entity is associated with the contact ID of the short message; if the result of the judgment is No, then in the step S205, associating the contact ID of the short message with the name entity; if the result of the judgment is Yes, advancing to a step S206; in the step S206, judging whether or not there exist other name entities in the name entity list of the history short message; if the result of the judgment is Yes, returning to the step S201; if the result of the judgment is No, ending the flow.

Figure 3:
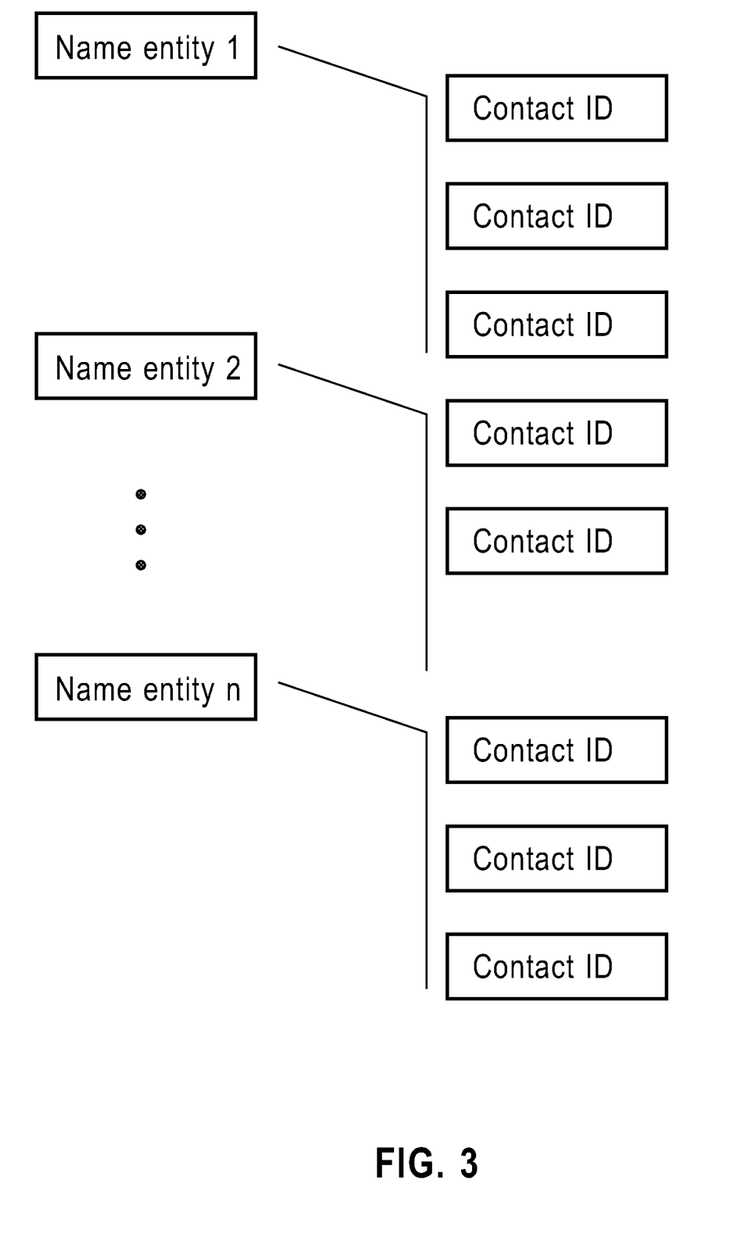
FIG. 3 shows the name entity association database constructed according to an embodiment of the invention.

The name entity association database constructed according to the embodiment of the invention shall be updated with the increase of the history short messages. FIG. 3 shows a name entity association database constructed according to an embodiment of the invention. It can be seen that, under the index of each name entity, there are contact IDs corresponding to short messages containing the name entity. Those skilled in the art can appreciate that, in the construction of the name entity association database, various kinds of databases can be used for associating the name entity with the contact IDs, and FIG. 3 is not a restricted example.

Figure 4:
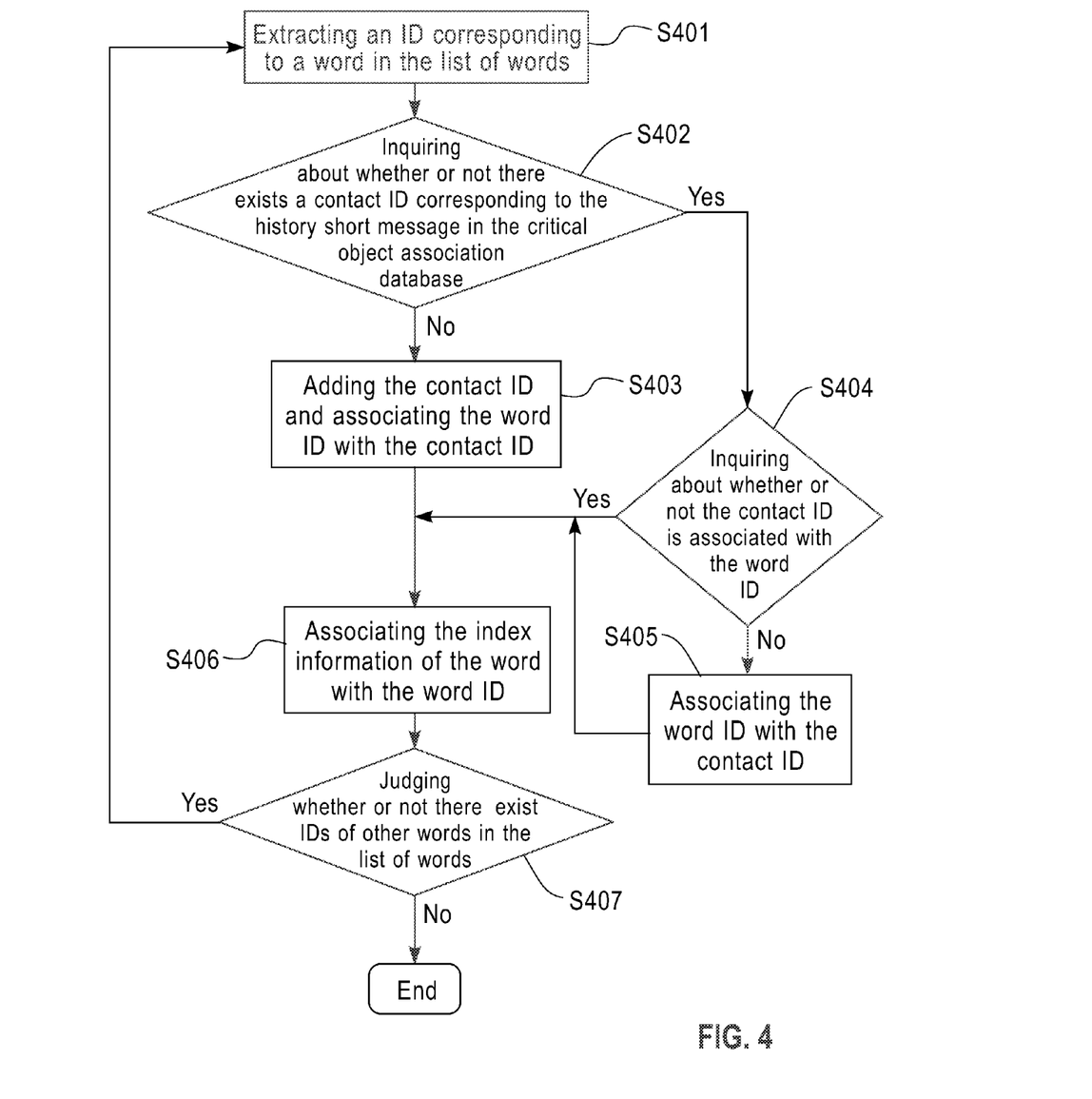
FIG. 4 shows a flow chart of constructing a critical object association database according to an embodiment of the invention.

FIG. 4 shows a flow chart of constructing a critical object association database according to an embodiment of the invention, wherein the critical object association database is constructed based on the identification information of the contact of the history short message, the list of words, the identification information of the words and the index information of the words. Specifically, in a step S401, extracting an ID corresponding to a word in the list of words; in a step S402, inquiring about whether or not there exists a contact ID corresponding to the history short message in the critical object association database; if the contact ID does not exist, in a step S403, adding the contact ID and associating the contact ID with the word ID; and further in a step S406, associating the index information of the word with the word ID; if the contact ID exists, in a step S404, further inquiring about whether or not the contact ID is associated with the word ID; if the contact ID is not associated with the word ID, then in the step S405, associating the word ID with the contact ID, and further advancing to the step S406 of associating the index information of the word with the word ID; if the contact ID is associated with the word ID, then advancing to the step S406 of associating the index information of the word with the word ID; in a step S407, judging whether or not there exist IDs of other words in the list of words; if the result of the judgment is Yes, returning to the step S401; if the result of the judgment is No, ending the flow.

Figure 5:
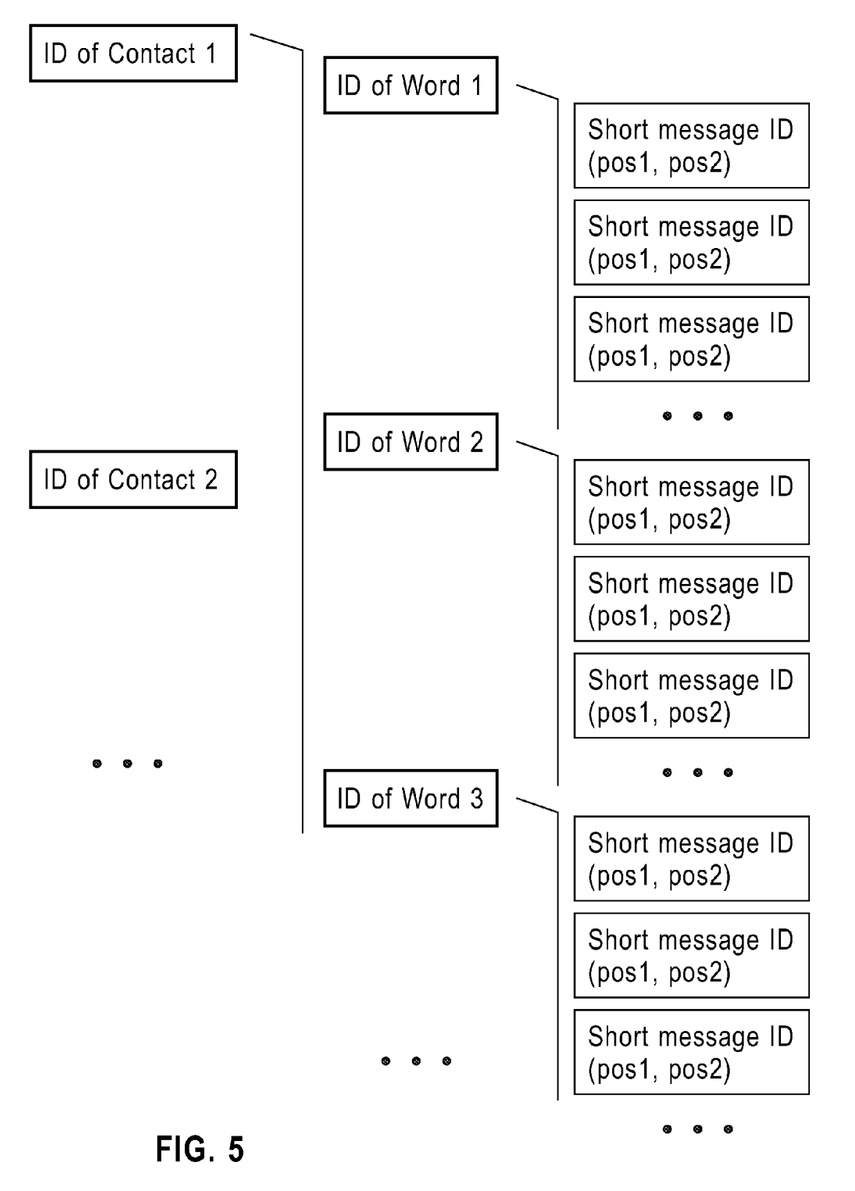
FIG. 5 shows the critical object association database constructed according to an embodiment of the invention.

The critical object association database constructed according to the embodiment of the invention shall be updated with the increase of the history short messages. FIG. 5 shows a critical object association database constructed according to an embodiment of the invention. It can be seen that, there is at least one word ID under the index of each contact ID, and there is the index information of at least one word under the index of each word ID, wherein the index information comprises a short message ID corresponding to the short message where the word is located and position information pos1, 2 . . . of the word in the short message. Those skilled in the art can appreciate that, in the construction of the critical object association database, various kinds of databases can be used for associating the word ID with the contact ID and the index information of the word, and FIG. 5 is not a restricted example.

In the step S103 of identifying a critical object in a new short message text of the user, the so-called critical object is a word in the new short message text that has a larger association with a contact. Specifically, a critical object in the new short message text is determined by calculating a weight of each word in the new short message text. After a new message text is cut to words, a plurality of words a $\{a_1, a_2, \ldots, a_n\}$ are generated, wherein a weight $W(a_i)$ of each word is relevant to a semantic importance $W_b$ and a global importance $W_g$, i.e., $W(a_i)=W_b+W_g$. The semantic importance $W_b$ is importance of a word in the new short message text, and is relevant to times c the word appears in the new short message text and a length s of the new short message text, i.e., $W_b=f(c)/s$. The global importance is a sum of importance of all contacts p $\{p_1, p_2, \ldots p_m\}$ contained in the critical object association database, i.e., $W_g=\Sigma_j^m W(p_j, a_i)$, $i \in (1, \ldots n)$, where the weight of $a_i$ with respect to the contact $p_j$ can be calculated with reference to the method for calculating $W(a_i)'$ below. After the weight $W(a_i)$ of each word is calculated, a word with a larger weight is selected as a critical object.

In the step S104 of analyzing an association between the critical object and the contacts by using the semantic association database, according to an embodiment of the invention, the association between the critical object and the contacts is analyzed by using the critical object association database, and the association between the critical objects in the critical object association database and the contacts is calculated, i.e., importance of the critical objects to the contacts in the critical object associated base.

Specifically, for a critical object word $a_i$, the word $a_i$ appears in a plurality of messages under a plurality of contacts $p\{p_1, p_2, \ldots p_m\}$. Assuming that it appears in n messages $m\{m_1, m_2, \ldots m_n\}$ of the contacts, and times each message word $a_i$ appears respectively are $c_1, c_2, \ldots c_n$, and lengths of the messages $m\{m_1, m_2, \ldots m_n\}$ respectively are $s_1, s_2, \ldots s_n$, the time when the messages $m\{m_1, m_2, \ldots m_n\}$ are sent or received is $t_1, t_2, \ldots t_n$, the weight of the word $a_i$ with respect to the contact $p_j$ based on a message $m_j$ is calculated by $W(m_j)=f(c_j)/s_j(t_c-t_j)$, where $t_c$ is the current time, $t_j$ is the history time when the message is sent or received, $j \in (1, \ldots n)$. The weight of $a_i$ with respect to the contact $p_j$ is calculated based on all the messages $m\{m_1, m_2, \ldots m_n\}$, and the obtained n weights are accumulated to obtain the weight of the word $a_i$ with respect to the contact $$W(a_i)'=\Sigma_{j=1}^n W(m_j).$$

Finally, an importance score of the new short message with respect to the contact is calculated by means of vector product, i.e., the importance score=$W(a_i) \cdot W(a_i)'$, where $a_i$ is the critical object in the new short message. Due to similar reasons, weights of the critical word object $a_i$ with respect to other contacts are calculated and finally importance scores of the new short message with respect to the other contacts are calculated.

In the step S105 of recommending a short message recipient to the user according to a strength of association, a contact whose importance score of the new short message with respect to the contact is the highest is recommended to the user as the short message recipient.

Figure 6:
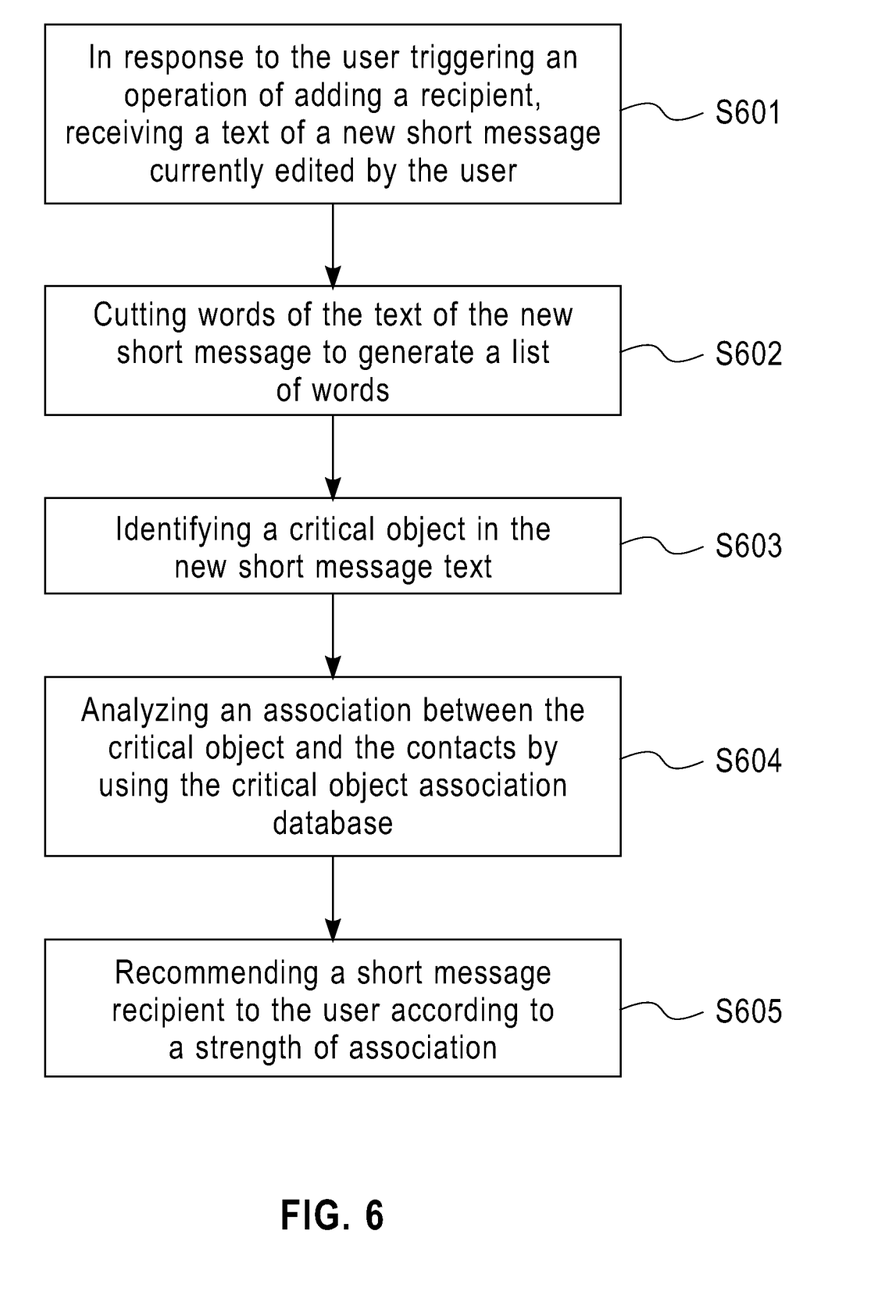
FIG. 6 shows a flow chart of recommending a short message recipient to a user according to an embodiment of the invention.

FIG. 6 shows a flow chart of recommending a short message recipient to a user according to an embodiment of the invention: in a step S601, in response to the user triggering an operation of adding a recipient, receiving a text of a new short message currently edited by the user; in a step S602, cutting words of the text of the new short message to generate a list of words; in a step S603, identifying a critical object in the new short message text; in a step S604, analyzing an association between the critical object and the contacts by using the critical object association database; and in a step S605, recommending a short message recipient to the user according to a strength of association.

Figure 7:
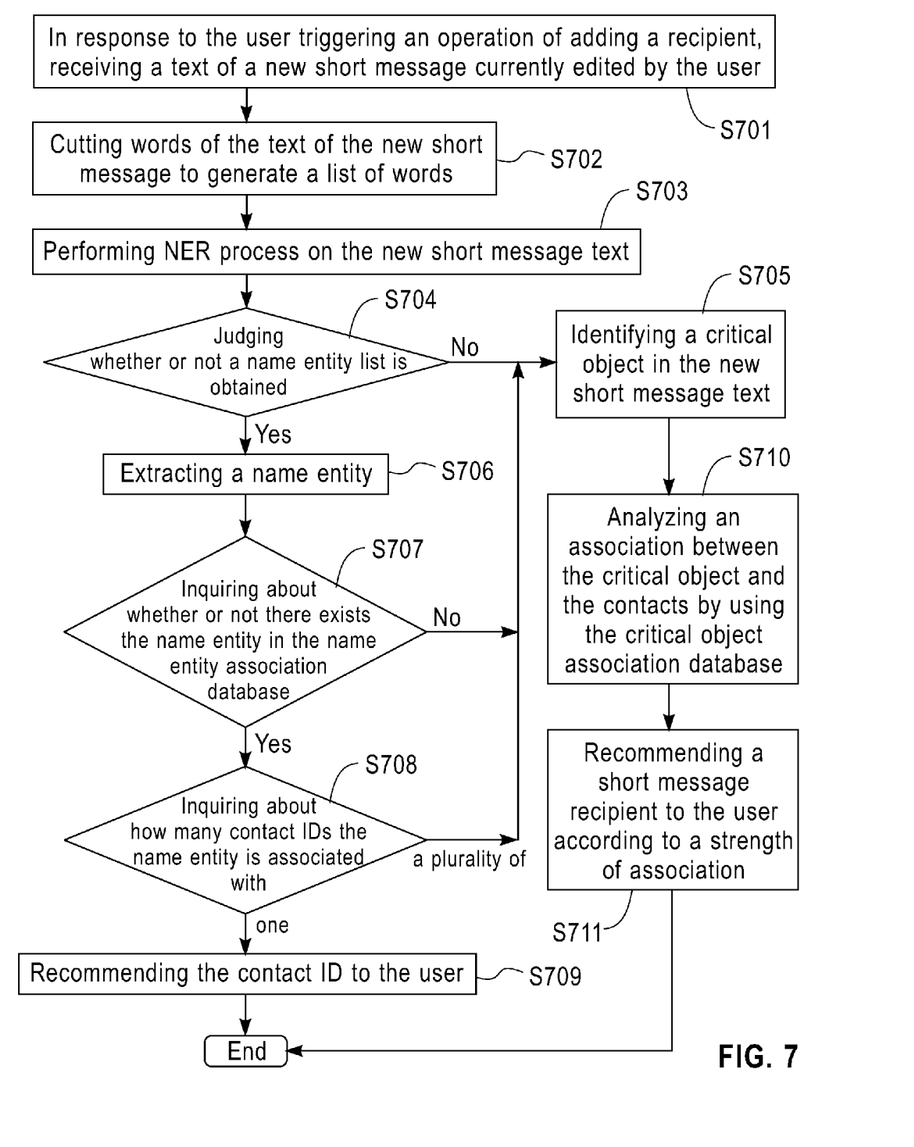
FIG. 7 shows a flow chart of recommending a short message recipient to a user according to an embodiment of the invention.

According to an embodiment of the invention, the association between the critical object and the contacts is analyzed by using the name entity association database and the critical object association database. FIG. 7 shows a flow chart of recommending a short message recipient to a user according to an embodiment of the invention: in a step S701, in response to the user triggering an operation of adding a recipient, receiving a text of a new short message currently edited by the user; in a step S702, cutting words of the text of the new short message to generate a list of words; in a step S703, performing NER process on the new short message text; in a step S704, judging whether or not a name entity list is obtained.

If the result of the judgment is No, in a step S705, identifying a critical object in the new short message text; if the result of the judgment is Yes, in a step S706, extracting a name entity from the name entity list; in a step S707, inquiring about whether or not there exists the name entity in the name entity association database; if the result of the judgment is No, advancing to the step S705 of identifying the critical object in the new short message text; if the result of the judgment is Yes, advancing to a step S708 of inquiring about how many contact IDs the name entity is associated with; if there is only one contact ID, in a step S709, recommending the contact ID to the user and ending the flow; if there are a plurality of contact IDs associated therewith, advancing to the step S705 of identifying a critical object in the new short message text; in a step S710, analyzing an association between the critical object and the contacts by using the critical object association database; and in a step S711, recommending a short message recipient to the user according to a strength of association and ending the flow.

Figure 8:
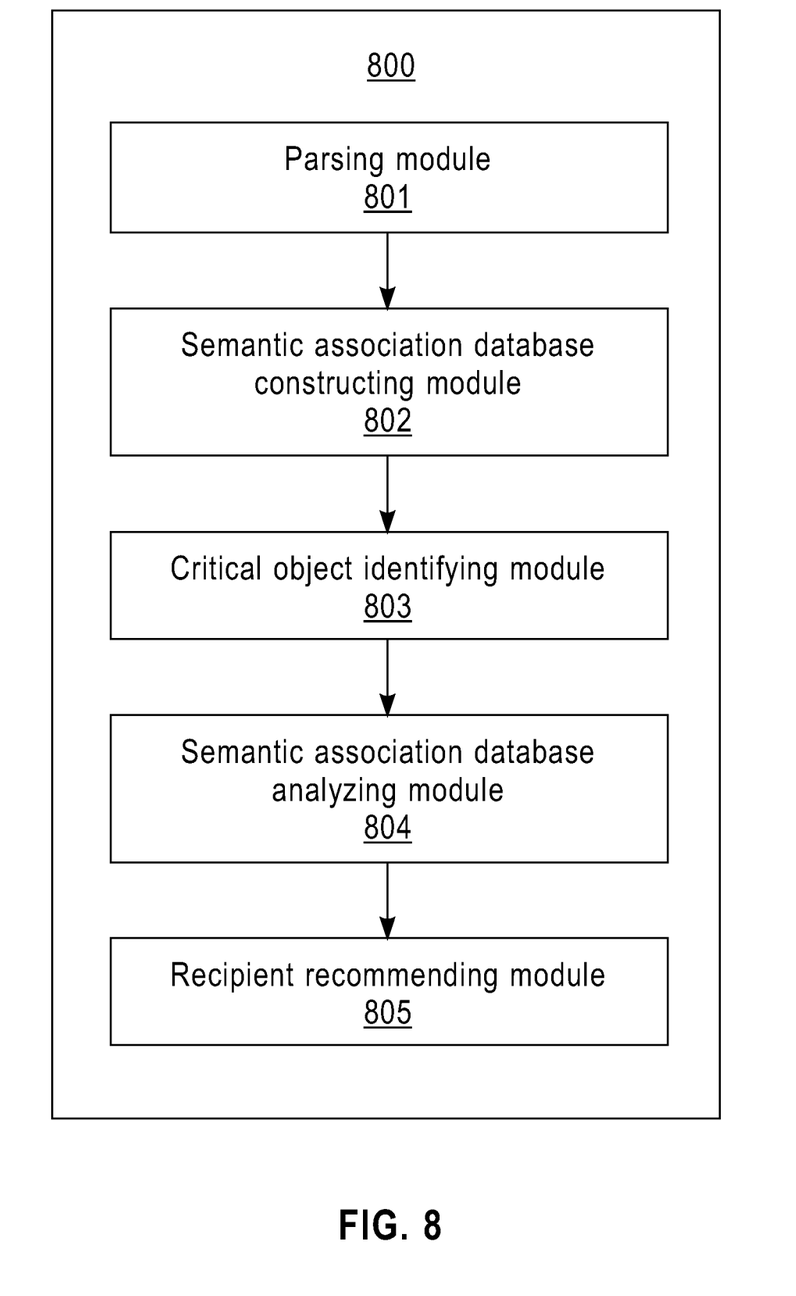
FIG. 8 shows an apparatus for recommending a short message recipient according to an embodiment of the invention.

Based on the same inventive concept, the present invention provides an apparatus for recommending a short message recipient. FIG. 8 shows an apparatus for recommending a short message recipient according to an embodiment of the invention, comprising: a parsing module 801 configured to parse history short messages of a user to generate data associated with contacts; a semantic association database constructing module 802 configured to construct a semantic association database by using the data; a critical object identifying module 803 configured to identify a critical object in a new short message text; a semantic association database analyzing module 804 configured to analyze an association between the critical object and the contacts by using the semantic association database; and a recipient recommending module 805 configured to recommend a short message recipient to the user according to a strength of association.

According to an embodiment of the invention, the parsing module 801 is further configured to acquire identification information of the contacts of the history short messages; and perform a cut word process on the texts of the history short messages to generate a list of words of the history short messages, identification information of the words and index information of the words.

According to an embodiment of the invention, the semantic association database constructing module 802 further comprises a critical object association database constructing module configured to extract identification information corresponding to at least one word in the list of words of the history short message; inquire about whether or not there exists identification information of the contact corresponding to the history short message in the critical object association database; if the result of the inquiry is No, add to the critical object association database the identification information of the contact and associate the identification information of the at least one word with the identification information of the contact, and associate the index information of the at least one word with the identification information of the word.

According to an embodiment of the invention, the parsing module 801 is further configured to acquire identification information on the contacts of the history short messages and acquire a name entity list of the history short messages by performing name entity recognition on texts of the history short messages.

According to an embodiment of the invention, the semantic association database constructing module 802 further comprises a name entity association database constructing module configured to extract from the name entity list of the history short message at least one name entity; inquire about whether or not there exists the name entity in the name entity database; if the result of the inquiry is No, add the name entity to the name entity database; and associate the identification information of the contact of the history short message with the name entity.

According to an embodiment of the invention, the recipient recommending module 805 is further configured to acquire a name entity list of a new short message by performing name entity recognition on a text of the new short message; extract at least one name entity from the name entity list of the new short message; inquire about whether or not there exists the name entity in the name entity association database; if the result of the inquiry is Yes, inquire about identification information of how many contacts the name entity is associated with; if there is identification information of only one contact, recommend the identification information of the contact to the user.

According to an embodiment of the invention, the critical object identifying module 803 is further configured to identify a critical object in the new short message text by calculating importance of at least one word in the list of words in the new short message text and importance of at least one word in the list of words to contacts contained in the critical object association database.

According to an embodiment of the invention, the semantic association database analyzing module is further configured to calculate a weight $W(a_i)$ of the critical object of the new short message text with respect to a contact $p_j$ in the critical object association database where $a_i$ is a critical object; calculate a weight $W(a_i)'$ of the critical object of the new short message text with respect to the new short message text; and calculate a vector product of the weight $W(a_i)$ and the weight $W(a_i)'$ to obtain a strength of association between the critical object of the new short message text and the contact $p_j$.

The weight $W(a_i)$ of the critical object of the new short message text to a contact $p_j$ in the critical object association database and the weight $W(a_i)'$ of the critical object of the new short message text to the new short message text can be calculated with reference to the above described methods.

As will be appreciated by one skilled in the art, at least some aspects of the present invention can be embodied as a computer program product. The program that defines functions of the invention can be delivered to a data storage system or a computer system through various signal carrying mediums. The signal carrying medium can be, for example, but not limited to, unwritable storage medium (e.g., CD-ROM), writable storage medium (e.g., a floppy disk, a hard disk driver, a read/write CD ROM, an optical medium) and communication medium such as computer and telephone network comprising Ethernet.

Therefore, it should be appreciated that, when such a type of signal carrying medium carries or is encoded with computer readable instructions for managing the functions of the method for the invention, it represents alternative embodiments of the invention. The invention can be implemented in a form of hardware, software, firmware or a combination thereof. The invention can be carried out in a concentrated manner in a computer system, or be carried out in a distributed manner in which different components are distributed in a plurality of interconnected computer systems. Any computer systems or other devices adapted to carrying out the invention described in the disclosure are suitable. Preferably, the invention is implemented in a combination of computer software and computer hardware in which when the computer program is loaded and executed, the computer system is controlled to carry out the method for the invention or constitute the system of the invention.

The above only gives preferred embodiments of the invention for purposes of illustration and explanation, but is not intended to be exhaustive or limited to the invention in the form disclosed. Obviously, any modifications and variations are possible in light of the above teaching. Such modifications and variations apparent to those skilled in the art are incorporated in the scope of the invention defined by the appended claims.

What is claimed is:

1. A method of recommending a short message recipient, comprising steps of:
   detecting an operation to add short message recipient by a user;
   receiving a text of a new short message currently edited by the user in response to detecting the operation to add the short message recipient;
   cutting words of the text of the new short message to generate a list of words;
   identifying a critical object in a new short message text of the user;
   analyzing an association between the critical object and the contacts by using a crucial object association database;
   recommending a short message recipient to the user according to a strength of association;
   parsing history short messages of the user to generate the data associated with the contacts; and
   constructing the critical object association data using the data,
   wherein the analyzing an association is based on a weight $W(a_i)$ of the critical object with respect to a contact $p_j$ in the critical object association data base and weight $W(a_i)'$ of the critical object with respect to the new short message text, and wherein the analyzing the association further comprises calculating a vector product of the $W(a_i)$ and the $W(a_i)'$ to obtain a strength of association between the critical object of the new short message text and the contact $p_i$ and
   wherein constructing the critical object association database by using the data comprises:
   extracting identification information corresponding to at least one word in the list of words of the history short message;
   inquiring about whether or not there exists identification information of the contact corresponding to the history short message in the critical object association database; and
   if the result of the inquiry is No, adding to the critical object association database the identification information of the contact and associating the identification information of the at least one word and the index information of the at least one word with the identification information of the contact.

2. The method according to claim 1, wherein the parsing history short messages of a user to generate data associated with contacts further comprises:
 acquiring identification information on the contacts of the history short messages; and
 acquiring a name entity list of the history short messages by performing name entity recognition on texts of the history short messages.

3. The method according to claim 2, wherein constructing the critical object association database by using the data comprises constructing a name entity association database by using the data.

4. The method according to claim 3, wherein constructing a name entity association database by using the data further comprises:
 extracting from the name entity list of the history short message at least one name entity;
 inquiring about whether or not there exists the name entity in the name entity database;
 if the result of the inquiry is No, adding the name entity to the name entity database; and
 associating the identification information of the contact of the history short message with the name entity.

5. The method according to claim 4, further comprising:
 acquiring a name entity list of a new short message by performing name entity recognition on a text of the new short message;
 extracting at least one name entity from the name entity list of the new short message;
 inquiring about whether or not there exists the at least one name entity in the name entity association database;
 if the result of the inquiry is Yes, inquiring about identification information of how many contacts the at least one name entity is associated with; if the at least one name entity is associated with identification information of only one contact, recommending the identification information of the contact to the user.

6. The method according to claim 1, wherein the identifying a critical object in a new short message text of the user further comprises:
 identifying a critical object in a new short message text of the user by calculating importance of at least one word in the list of words in the new short message text and importance of at least one word in the list of words to contacts contained in the critical object association database.

7. An apparatus for recommending a short message recipient, comprising:
 a parsing module configured to detect an operation to add short message recipient by a user, receive a text of a new short message currently edited by the user in response to detecting the operation to add the short message recipient, to cut words of the text of the new short message to generate a list of words, and to parse history short messages of the user to generate data associated with contacts;
 an identifying module configured to identify a critical object in a new short message text of the user;
 a database analyzing module in electrical communication with a critical object association database to analyze an association between a critical object and the contacts, and to construct a critical object association database using the data; and
 a recipient recommending module configured to recommend a short message recipient to the user according to a strength of association,
 wherein the database analyzing module analyzes the association between a critical object and the contacts based on a weight $W(a_i)$ of the critical object with respect to a contact $p_j$ in the critical object association data base and weight $W(a_i)'$ of the critical object with respect to the new short message text, and wherein the analyzing the association further comprises calculating a vector product of the $W(a_i)$ and the $W(a_i)'$ to obtain a strength of association between the critical object of the new short message text and the contact $p_j$, and
 wherein constructing the critical object association database by using the data comprises:
  extracting identification information corresponding to at least one word in the list of words of the history short message;
  inquiring about whether or not there exists identification information of the contact corresponding to the history short message in the critical object association database; and
 if the result of the inquiry is No, adding to the critical object association database the identification information of the contact and associating the identification information of the at least one word and the index information of the at least one word with the identification information of the contact.

8. A computer readable storage medium tangibly embodying a computer readable program code having computer readable instructions which, when implemented, cause a computer to carry out the steps of a method comprising:
 detecting an operation to add short message recipient by a user;
 receiving a text of a new short message currently edited by the user in response to detecting the operation to add the short message recipient;
 cutting words of the text of the new short message to generate a list of words;
 identifying a critical object in a new short message text of the user;
 analyzing an association between the critical object and the contacts by using a crucial object association database;
 recommending a short message recipient to the user according to a strength of association;
 parsing history short messages of the user to generate the data associated with contacts; and
 constructing the critical object association database by using the data,
 wherein the analyzing an association is based on a weight $W(a_i)$ of the critical object with respect to a contact $p_j$ in the critical object association data base and weight $W(a_i)'$ of the critical object with respect to the new short message text, and wherein the analyzing the association further comprises calculating a vector product of the $W(a_i)$ and the $W(a_i)'$ to obtain a strength of association between the critical object of the new short message text and the contact $p_j$, and
 wherein the constructing a critical object association database by using the data further comprises:
  extracting identification information corresponding to at least one word in the list of words of the history short message;
  inquiring about whether or not there exists identification information of the contact corresponding to the history short message in the critical object association database; and
  if the result of the inquiry is No, adding to the critical object association database the identification information of the contact and associating the identification information of the at least one word and the index information of the at least one word with the identification information of the contact.

9. The computer readable storage medium according to claim 8, wherein identifying a critical object in a new short message text of the user further comprises:

identifying a critical object in a new short message text of the user by calculating importance of at least one word in the list of words in the new short message text and importance of at least one word in the list of words to contacts contained in the critical object association database.

10. The computer readable storage medium according to claim 8, wherein the parsing history short messages of a user to generate data associated with contacts further comprises:

acquiring identification information on the contacts of the history short messages; and acquiring a name entity list of the history short messages by performing name entity recognition on texts of the history short messages.

11. The computer readable storage medium according to claim 10, wherein the constructing a critical object association database by using the data comprises constructing a name entity association database by using the data.

12. The computer readable storage medium according to claim 11, wherein constructing a name entity association database by using the data further comprises:

extracting from the name entity list of the history short message at least one name entity;

inquiring about whether or not there exists the name entity in the name entity database;

if the result of the inquiry is No, adding the name entity to the name entity database; and associating the identification information of the contact of the history short message with the name entity.

* * * * *